Figure 1:
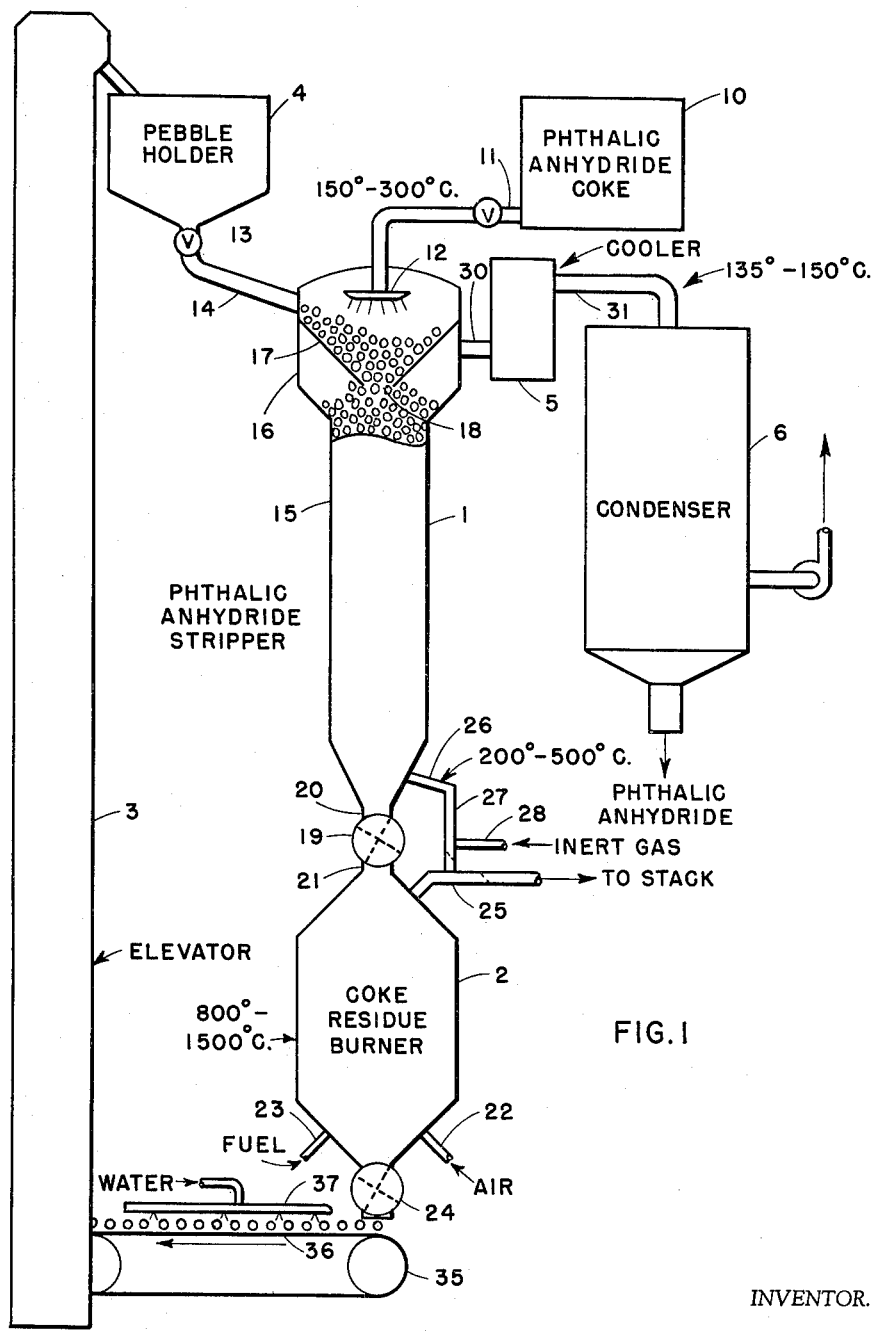

Oct. 3, 1961

G. H. MICHEL 3,002,980

RECOVERY OF PHTHALIC ANHYDRIDE FROM PHTHALIC ANHYDRIDE COKE

Filed Aug. 30, 1957

2 Sheets-Sheet 1

INVENTOR.
GEORGE H. MICHEL
BY
*Wm. P. Speelman*
ATTORNEY

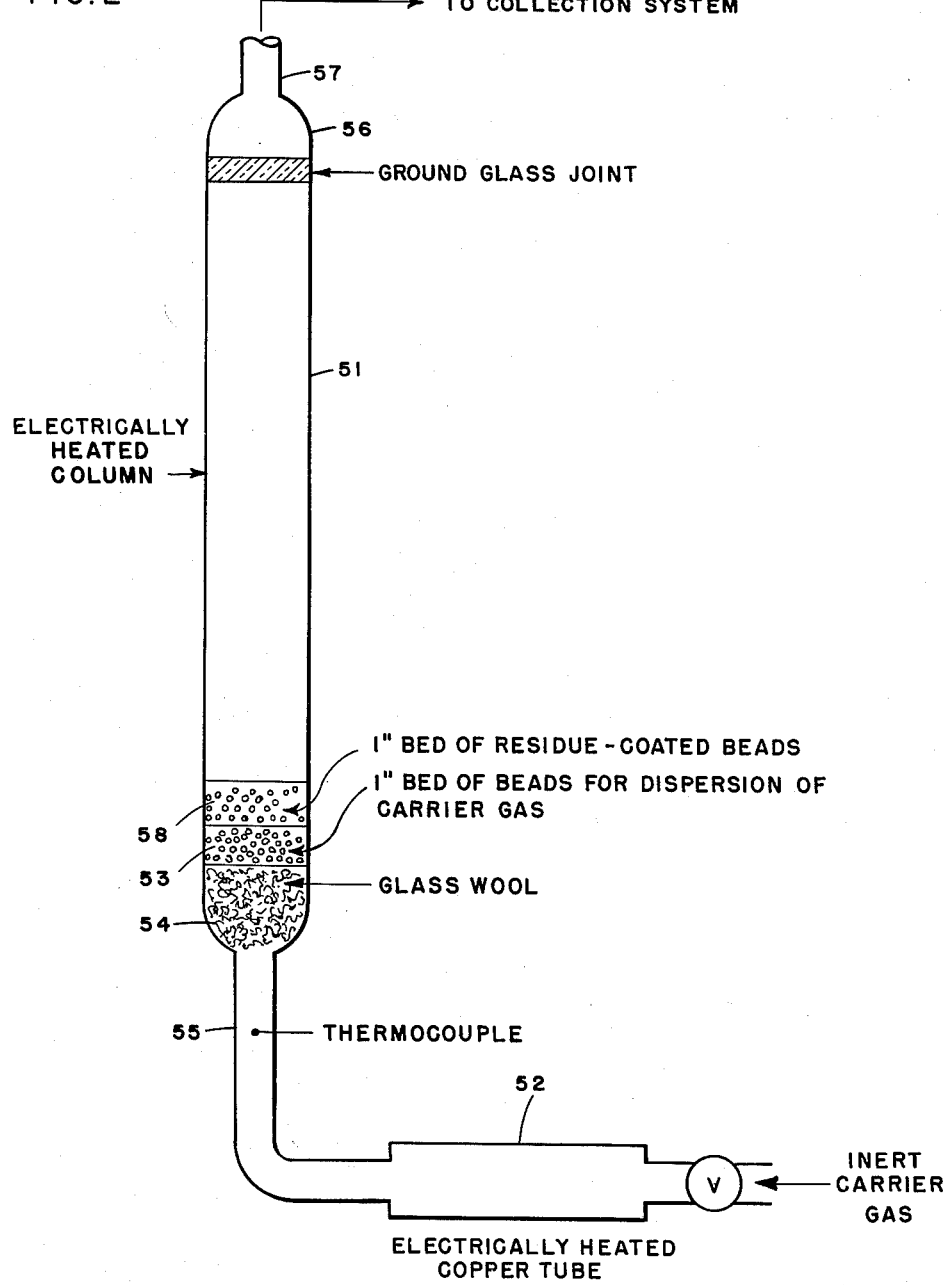

United States Patent Office 3,002,980
Patented Oct. 3, 1961

3,002,980
RECOVERY OF PHTHALIC ANHYDRIDE FROM PHTHALIC ANHYDRIDE COKE
George H. Michel, Dumont, N.J., assignor to American Cyanamid Company, New York, N.Y., a corporation of Maine
Filed Aug. 30, 1957, Ser. No. 681,378
5 Claims. (Cl. 260—346.7)

This invention relates to a method and apparatus for the recovery of phthalic anhydride values from the by-product coke obtained as a residue from the distillation purification of phthalic anhydride converter products.

In the commercial production of pure phthalic anhydride the vapors obtained from the catalytic air oxidation of naphthalene, ortho-xylene and other phthalic anhydride-producing materials are cooled and an impure material known as converter product is recovered by condensation. This converter product contains alpha-naphthoquinone and maleic and benzoic acids as impurities. It is ordinarily purified by adding a condensing agent such as sulfuric acid or sodium hydroxide and heating under reflux conditions for periods of time up to 18–24 hours. It is then distilled and a purified phthalic anhydride is recovered either by fractional condensation or by fractional distillation. The raw material used in practicing the present invention is the residue from this distillation, which is known as phthalic anhydride coke.

The composition of phthalic anhydride coke is described in U.S. Patent No. 1,851,383; it ordinarily contains about 20–55% of residual phthalic anhydride, the remainder being tarry residues formed during the heating period. A purification procedure resulting in the formation of distillation residues of relatively low phthalic anhydride content is described in U.S. Patent No. 2,670,325.

Phthalic anhydride values are ordinarily recovered from the distillation residues in a so-called coke exhauster, which is a vertical still pot provided with agitators. The distillation residues are charged into this equipment and heated until they can no longer be handled; the yields obtainable are about 50% of the phthalic anhydride remaining in the coke. It is a principal object of the present invention to provide an improved distillation procedure and apparatus which will allow almost complete recovery of all of the phthalic anhydride in the residues, and which will also avoid the problem of removing the exhausted residue from the still. Since the exhausted residue is a pyrophoric material, the process of the invention also avoids a definite safety hazard, which is another advantage.

In accordance with the process of my invention the phthalic anhydride coke, or distillation residue, is melted and coated onto particles of a solid inert carrier and then passed into contact with a flow of hot gases capable of vaporizing the phthalic anhydride from the coating. By this procedure up to 98% of the phthalic anhydride can be vaporized from the coke. The vaporized phthalic anhydride is recovered from the resulting gas mixture, preferably by condensation, while the residual carbonaceous film is burned from the inert carrier material. The carrier is then returned to receive another coating of the molten phthalic anhydride coke and is reused in the process.

I have found that, in order to vaporize a major proportion of phthalic anhydride from the coke, the inert gas should be preheated to a temperature well above the distillation temperature thereof and preferably to at least about 150°–200° C. Higher gas temperatures up to the decomposition temperature of the phthalic anhydride, about 600° C., can of course be used. In general, I prefer to use inert gas temperatures within the range of about 200°–500° C. By "inert gas" I mean, of course, a gas which is not reactive with phthalic anhydride, and any suitable gas of this type may be employed. I prefer, however, to use the stack gases from the second stage of my process, in which the carbonaceous residue is burned from the carrier material; these gases may be diluted, if necessary, with off-gases from the condensers of the phthalic anhydride-producing plant. These off-gases have a low oxygen content but contain residual uncondensed phthalic anhydride which can be recovered when they are used in my process.

The invention will be further described and illustrated with reference to the accompanying drawings, wherein:

FIG. 1 is a diagrammatic illustration of equipment suitable for use in practicing the invention on a commercial scale, and FIG. 2 illustrates the pilot plant apparatus that was used in obtaining the experimental results reported.

Referring to FIG. 1, the equipment consists generally of a phthalic anhydride stripper 1, a coke residue burner 2, a bucket elevator 3 for returning the inert carrier to the process, a reservoir 4 for the carrier material, a cooler 5 for reducing the temperature of the phthalic anhydride-containing gases from the stripper and a condenser 6. Phthalic anhydride coke is preferably melted in jacketed melter, not shown, and is fed from a jacketed feed tank 10 through a valved pipe 11 to a spray head 12 or other suitable coating device in the top of the stripper 1.

Simultaneously, particles of an inert material such as granite or quartz pebbles, preferably having diameters from about 1/4" to 2", are fed into the stripper from the reservoir 4 through a valve 13 and one or more pipes 14. The stripper 1 preferably consists of a lower cylindrical portion 15 having a diameter such as to produce the optimum rate of gas flow through the body of coated pebbles therein and an upper cylindrical portion 16 of larger diameter containing a conical baffle 17. The pebbles from the reservoir 4 are discharged onto the baffle 17 through one or more pipes of the type indicated by reference numeral 14, the number and location about the periphery being such that the pebbles will become coated with molten phthalic anhydride coke from the spray head 12. The coated pebbles pass by gravity flow through the central opening 18 in the baffle 17 and thence downwardly through the main portion 15 of the stripper, their rate of passage being controlled by a star valve 19 in the restricted outlet 20 thereof.

The coke residue burner 2 is a preferably cylindrical chamber lined with firebrick and located immediately below the outlet valve 19 of the stripper and in communication therewith by means of an inlet pipe 21. One or more air lines 22 are located in the base of this burner and also a valved fuel line 23, which is used in starting the process and also to regulate combustion temperatures if necessary. The pebbles leaving the stripper 1 drop into the coke residue burner 2, where their carbonaceous coating is removed by combustion, after which they pass through a discharge valve 24 for cooling and return to the pebble reservoir 4.

Hot stack gases having a low oxygen content are withdrawn from the burner 2 through outlet pipe 25 in the upper part thereof, and all or a portion of these gases may be used as a source of heat to distill phthalic anhydride from the coke in the stripper 1. This is accomplished by connecting the inert gas inlet pipe 26, in the base of the stripper 1, with pipe 25 by means of a connecting pipe 27. Branch pipe 28, which connects into pipe 27, is in communication with a source of cooler inert gases such as those issuing from the condensers of a phthalic anhydride plant; by adjusting the proportions of cool and hot gases from the two sources any gas temperature within the range of about 200°–600° C. can easily be obtained.

An outlet pipe 30 connects the phthalic anhydride stripper 1 with the cooler 5. This pipe is preferably attached to the upper cylindrical section 16 of the stripper at a level just below the baffle 17 in order to provide an unrestricted gas passage, as shown on the drawing. The cooler 5 may be of any type suitable for reducing the phthalic anhydride-containing gases to a temperature slightly above their dew point, preferably about 135°–150° C. or slightly lower. Preferably a tubular cooler is used in which the tubes containing the gases are surrounded by water or low-pressure steam. The gases leaving the cooler 5 are passed through a pipe 31 into the condenser 6, where a phthalic anhydride product in the form of needle crystals of good purity is obtained by condensation. Although any type of condenser may be used, the oil-cooled apparatus described in U.S. Patent No. 2,455,314 is preferred in which the gases are cooled to a temperature between 132° C. and about 80–90° C. by means of internal cooling coils. As is shown in this patent, the gases leaving the oil-cooled condensers are preferably passed through a secondary condensing system for the removal of residual phthalic anhydride therefrom.

Although any suitable means may be used to return the inert carrier material from the coke residue burner 2 to the reservoir 4, a belt conveyor 35 communicating with the base of the elevator 3 is shown on the drawing. The pebbles from the discharge valve 24 are deposited on the moving belt 36 of this conveyor and may pass under a water spray 37 to reduce their temperature and wash off any adhering impurities if desired.

It will be seen that the described procedure and embodiment provide a method and apparatus for continuously coating the inert carrier particles with molten phthalic anhydride coke, forming the coated particles into a vertical column through which a flow of hot inert gas is passed upwardly and then passing the particles into a combustion zone wherein the carbonaceous residue is removed by burning with an oxygen-containing gas at combustion temperatures. This procedure has a number of important advantages over the distillation methods previously used for phthalic anhydride recovery; it permits the vaporization of practically all of the phthalic anhydride from the coke residues, as compared with the 50% yields that have previously been obtained in pot stills, and it also disposes of the carbonaceous residue of the coke by burning without the necessity of separate handling. The apparatus illustrated has a high capacity, and can be used to recover phthalic anhydride from large quantities of coke with a minimum of manual labor.

The following example describes the test results obtained in the pilot plant apparatus shown on FIG. 2 of the drawings. This equipment is made up of a small vertical column 51, a gas heating tube 52 and a collection system for recovering vaporized phthalic anhydride. The column 51 contains a layer of glass beads 53 which is supported on glass wool 54 and functions as a distributor for hot carrier gas introduced through inlet pipe 55. A removable top section 56 containing an outlet tube 57 leading to the collection system is attached to the column 51 by means of a ground glass joint.

About 44 grams of ¼-inch glass beads were coated with from 3.7 to 4.1 grams of a phthalic anhydride distillation residue which contained 51.4% of phthalic anhydride by spraying the beads with the molten residue. The coated beads were then placed in the column 51 at the location shown by reference numeral 58. A stripping gas (nitrogen or the flameless combustion products of a natural gas-air mixture) was preheated in the heating tube 52 and passed upwardly through the coated beads. The column 51 and the tube 52 were heated by electric resistance strips to maintain the stripping gas temperatures shown in the following table. The temperature of the gas was measured by thermocouples both at the inlet to the column, as shown, and just above the bed of coated beads. The gas leaving the column through outlet 57 passed through a dry flask where much of the phthalic anhydride condensed and then through a water scrubber. At ten-minute intervals both the flask and the scrubber were replaced and the amount of acids collected was determined. The conditions used and the results obtained were as follows:

| Expt. No. | Temp., °C. | Linear Velocity, ft./sec | Gas Rate, l./min | Acids in Charge as PAA, g. | Sample Time, min. | Acid Collected as PAA, g. | Cumulative Yield, Percent of Charge |
|---|---|---|---|---|---|---|---|
| 1 | 250–255 | .50 | 5.6 | 0.961 | 0–10 | 0.51 | 53.1 |
|   |         |     |     |       | 10–30 | 0.27 | 81.3 |
|   |         |     |     |       | 30–60 | 0.10 | 91.7 |
| 2 | 199–207 | 0.10 | 1.2 | 1.94 | 0–10 | 0.82 | 42.3 |
|   |         |      |     |      | 10–30 | 0.46 | 66.0 |
|   |         |      |     |      | 30–60 | 0.23 | 77.8 |
|   |         |      |     |      | 60–120 | 0.29 | 92.8 |
| 3 | 200–205 | 1.0 | 12.0 | 1.90 | 0–10 | 0.97 | 51.1 |
|   |         |     |      |      | 10–30 | 0.39 | 71.6 |
|   |         |     |      |      | 30–60 | 0.17 | 80.5 |
|   |         |     |      |      | 60–120 | 0.15 | 88.4 |
| 4 | 299–306 | 1.0 | 10.0 | 2.06 | 0–10 | 1.60 | 77.7 |
|   |         |     |      |      | 10–30 | 0.34 | 94.2 |
|   |         |     |      |      | 30–60 | 0.08 | 93.1 |
| 5 | 300–310 | 0.1 | 0.9 | 2.09 | 0–10 | 1.29 | 69.8 |
|   |         |     |     |      | 10–30 | 0.58 | 88.5 |
|   |         |     |     |      | 30–60 | 0.14 | 95.2 |
|   |         |     |     |      | 60–90 | 0.07 | 98.6 |
| 6 | 250–253 | 1.0 | 10.5 | 1.97 | 0–10 | 1.22 | 61.9 |
|   |         |     |      |      | 10–30 | 0.47 | 85.8 |
|   |         |     |      |      | 30–60 | 0.17 | 94.4 |
|   |         |     |      |      | 60–90 | 0.05 | 97.0 |
| 7 | 250–254 | 0.5 | 5.6 | 2.08 | 0–10 | 1.09 | 52.4 |
|   |         |     |     |      | 10–30 | 0.54 | 78.4 |
|   |         |     |     |      | 30–60 | 0.20 | 88.0 |
|   |         |     |     |      | 60–90 | 0.11 | 93.3 |

These results show that more than 90% of the phthalic anhydride can be recovered from the still residue at temperatures as low as 200° C., but that better results are obtained at 250–300° C. About 98% of the acids were recovered in 1 hour when a gas velocity of 1 foot per second and a 300° C. temperature were used.

A comparison of Experiments 1 and 7, in which only the quantity of residue coated on the beads was different, indicates that still larger quantities of residue can be applied without loss in efficiency. This indicates that higher concentrations of phthalic anhydride can be obtained in the gas stream with a resulting improvement in the plant capacity.

After each of the tests the carbonaceous residue was removed from the glass beads by combustion with a laboratory burner after which they were recoated for a subsequent test.

What I claim is:

1. A method of recovering phthalic anhydride from phthalic anhydride distillation coke which comprises coating particles of a solid inert carrier with said coke, contacting the particles so coated with a flow of hot inert gas and thereby vaporizing phthalic anhydride into said gas, drawing off the gas and recovering the phthalic anhydride therefrom, burning the carbonaceous residue from the carrier particles so treated by contacting them with an oxygen-containing gas at combustion temperatures and then returning the resulting carrier particles to the coating step for reuse in the process.

2. A method of recovering phthalic anhydride from phthalic anhydride distillation coke which comprises melting said coke and applying it as a coating to particles of a solid inert carrier, contacting the particles so coated with a flow of inert gas heated to about 200°–600° C. and thereby vaporizing phthalic anhydride from the coating into said gas, drawing off and cooling the gas and condensing the phthalic anhydride therefrom, burning the carbonaceous residue from the carrier particles so treated by contacting them with an oxygen-containing gas at combustion temperatures and then returning the carrier particles to the coating step for reuse in the process.

3. A method according to claim 2 in which the phthalic anhydride is vaporized from the carrier particles by contact with inert gas having a temperature of about 300° C.

4. A method of recovering phthalic anhydride from phthalic anhydride distillation coke which comprises melting said coke and applying it as a coating to particles of a solid inert carrier, vaporizing phthalic anhydride from the coating by forming particles so coated into a column and passing upwardly therethrough a flow of an inert gas heated to aobut 200°–600° C., drawing off the gas from said column and cooling it and condensing the phthalic anhydride therefrom, passing the carrier particles so treated into a combustion zone and burning the carbonacetous residue therefrom by passing an oxygen-containing gas through a bed thereof in said zone at combustion temperatures and then returning the carrier particles to the coating step for reuse in the process.

5. A method according to claim 4 in which the inert gas is passed through said column at a velocity of about 1 foot per second and a temperature of about 300° C.

References Cited in the file of this patent

UNITED STATES PATENTS

| | | |
|---|---|---|
| 1,698,345 | Puening | Jan. 8, 1929 |
| 1,712,082 | Koppers | May 7, 1929 |
| 2,390,031 | Schutte | Nov. 27, 1945 |
| 2,393,636 | Johnson | Jan. 29, 1946 |
| 2,432,872 | Ferro | Dec. 16, 1947 |
| 2,441,170 | Rose et al. | May 11, 1948 |
| 2,494,695 | Fisher | Jan. 17, 1950 |
| 2,526,710 | Thayer | Oct. 24, 1950 |
| 2,606,861 | Eastwood | Aug. 12, 1952 |
| 2,609,332 | Bowles et al. | Sept. 2, 1952 |
| 2,627,497 | Robinson | Feb. 3, 1953 |
| 2,702,091 | Smith | Feb. 15, 1955 |
| 2,764,533 | Oetjen et al. | Sept. 25, 1956 |
| 2,794,724 | Mayland | June 4, 1957 |

FOREIGN PATENTS

| | | |
|---|---|---|
| 549,602 | Canada | Dec. 3, 1957 |
| 184,144 | Great Britain | Mar. 22, 1923 |
| 305,106 | Great Britain | Jan. 28, 1929 |
| 748,710 | Great Britain | May 9, 1956 |